(12) United States Patent
Lee et al.

(10) Patent No.: US 7,632,602 B2
(45) Date of Patent: *Dec. 15, 2009

(54) THIN FILM BURIED ANODE BATTERY

(75) Inventors: Se-Hee Lee, Lakewood, CO (US); C. Edwin Tracy, Golden, CO (US); Ping Liu, Denver, CO (US)

(73) Assignee: Alliance For Sustainable Energy, LLC, Golden, CO (US)

( * ) Notice: Subject to any disclaimer, the term of this patent is extended or adjusted under 35 U.S.C. 154(b) by 48 days.

This patent is subject to a terminal disclaimer.

(21) Appl. No.: 10/901,863

(22) Filed: Jul. 29, 2004

(65) Prior Publication Data
US 2007/0009802 A1 Jan. 11, 2007

Related U.S. Application Data

(63) Continuation of application No. 10/110,581, filed as application No. PCT/US01/44025 on Nov. 13, 2001, now Pat. No. 6,805,999.

(51) Int. Cl.
H01M 10/04 (2006.01)
H01M 10/38 (2006.01)
H01M 4/40 (2006.01)
H01M 4/48 (2006.01)
H01M 4/66 (2006.01)

(52) U.S. Cl. ............... 429/162; 429/231.1; 429/231.2; 429/231.95; 429/245; 29/623.5

(58) Field of Classification Search ............... None
See application file for complete search history.

(56) References Cited

U.S. PATENT DOCUMENTS

| 4,003,753 | A | 1/1977 | Hall |
| 5,284,721 | A * | 2/1994 | Beard ............... 429/343 |
| 5,338,625 | A | 8/1994 | Bates |
| 5,350,645 | A * | 9/1994 | Lake et al. ............ 429/162 |
| 5,489,492 | A | 2/1996 | Asami et al. |
| 5,512,387 | A | 4/1996 | Ovshinsky |
| 5,569,520 | A | 10/1996 | Bates |
| 5,612,152 | A | 3/1997 | Bates |
| 5,871,865 | A | 2/1999 | Baker et al. |
| 5,895,731 | A | 4/1999 | Cllingempeel |
| 6,048,645 | A | 4/2000 | Saidi et al. |
| 6,090,504 | A | 7/2000 | Sung et al. |
| 6,168,884 | B1 | 1/2001 | Neudecker et al. |

(Continued)

FOREIGN PATENT DOCUMENTS

EP 0689260 A1 6/1994

(Continued)

*Primary Examiner*—Jonathan Crepeau
(74) *Attorney, Agent, or Firm*—John C. Stolpa

(57) ABSTRACT

A reverse configuration, lithium thin film battery (300) having a buried lithium anode layer (305) and process for making the same. The present invention is formed from a precursor composite structure (200) made by depositing electrolyte layer (204) onto substrate (201), followed by sequential depositions of cathode layer (203) and current collector (202) on the electrolyte layer. The precursor is subjected to an activation step, wherein a buried lithium anode layer (305) is formed via electroplating a lithium anode layer at the interface of substrate (201) and electrolyte film (204). The electroplating is accomplished by applying a current between anode current collector (201) and cathode current collector (202).

2 Claims, 2 Drawing Sheets

U.S. PATENT DOCUMENTS

| | | | |
|---|---|---|---|
| 6,402,796 B1 * | 6/2002 | Johnson | 29/623.5 |
| 6,652,605 B1 * | 11/2003 | Bourbon et al. | 29/623.1 |
| 6,805,999 B2 * | 10/2004 | Lee et al. | 429/162 |
| 2002/0018935 A1 * | 2/2002 | Okada | 429/231.95 |

FOREIGN PATENT DOCUMENTS

| | | |
|---|---|---|
| WO | WO 99/52824 | * 10/1999 |
| WO | WO 00/60689 | * 10/2000 |

* cited by examiner

Figure 1 – Prior Art
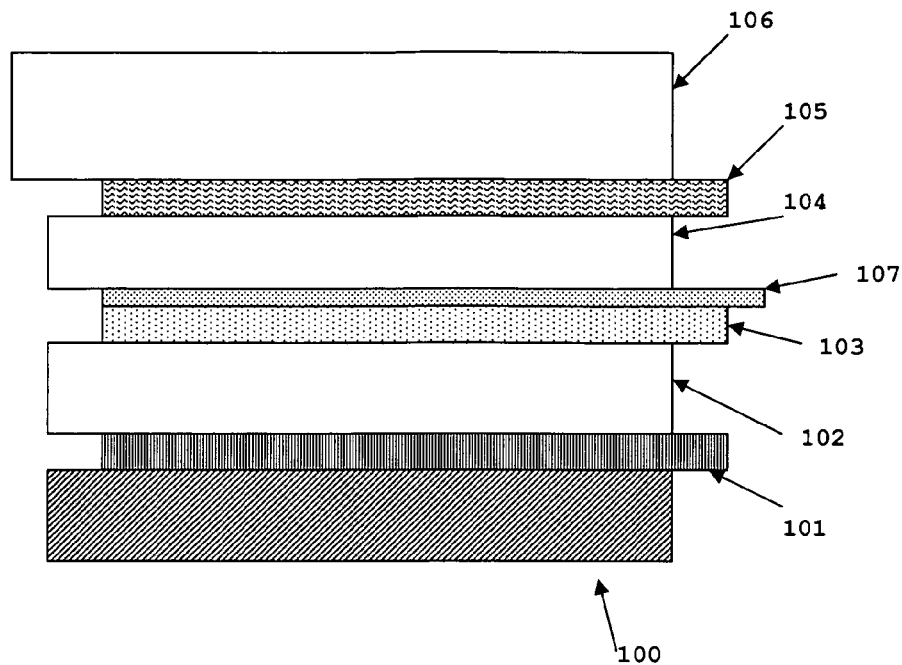
Figure 2
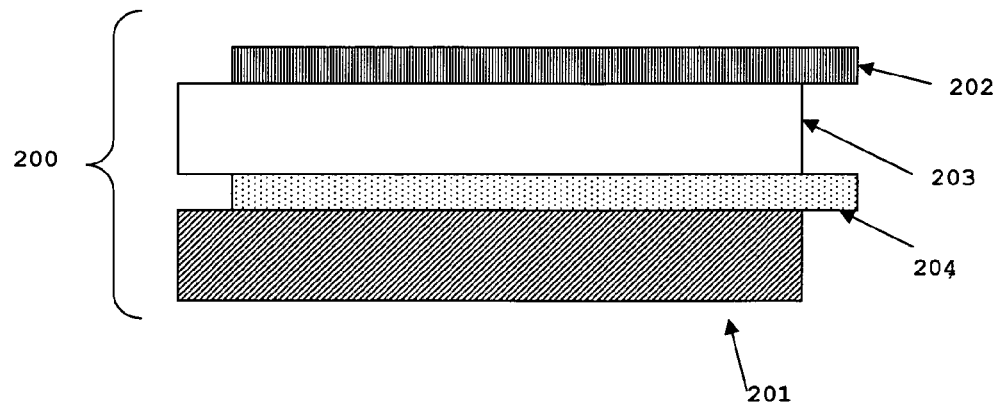

THIN FILM BURIED ANODE BATTERY

CROSS-REFERENCE TO RELATED APPLICATIONS

This application is a continuing application of U.S. application Ser. No. 10/110,581, filed Mar. 17, 2003, now U.S. Pat. No. 6,805,999, which application is incorporated herein in its entirety by reference, and which application is in turn a National Stage Application of International Application No. PCT/US01/44025 filed Nov. 13, 2001.

CONTRACTUAL ORIGIN OF THE INVENTION

The United States Government has rights in this invention pursuant to Contract No. DE-AC-36-99G010337 between the United States Department of Energy and The Midwest Research Institute.

TECHNICAL INVENTION

This invention relates to the fabrication of lithium thin film secondary batteries.

DISCLOSURE OF INVENTION

Batteries are galvanic electrochemical cells which store and supply electrical energy as a product of a chemical reaction. In their simplest conceptualization, batteries have two electrodes, one that supplies electrons by virtue of an oxidation process occurring at that electrode, termed the anode (hereinafter, "anodic processes"), and a second one that consumes electrons by virtue of a reduction process occurring at that electrode, termed the cathode (hereinafter, "cathodic processes").

There are two broad classifications of batteries, primary batteries and secondary batteries. In primary batteries, either the anodic process, or the cathodic process, or both are irreversible, as defined for electrochemical processes. For this reason, once the reagents participating in the reactions are by-and-large consumed, the battery can't be returned to a charged state by electrochemical means.

In secondary batteries the electron producing and consuming reactions are for the most part reversible, as defined for electrochemical processes, and therefore such a battery can be cycled between a charged and discharged state electrochemically.

The reactions employed in batteries to produce and consume electrons are redox reactions. A pair of such reactions is called a redox couple. Each redox reaction is termed a half cell, with two half cells constituting a simple battery when the half cells are placed in ionic communication such that voltage potential appears between the electrodes of the half cells. Typically, the electrodes of several sets of half cells are electrically coupled together in either series or parallel configuration to supply a greater voltage or a greater current, or both than that which is available from a single set of half cells.

The voltage potential of a simple battery (a single set of half cells) is fixed by the set of redox couples chosen to produce and consume electrons. The redox couples are chosen such that the potential energy of the electron producing reaction yields electrons of sufficient potential energy to supply electrons to the electron consuming reaction. The electromotive force (emf) supplied by the battery is the difference between the potential energy of the electrons produced by the electron producing reaction and that required of the electrons consumed by the electron consuming reaction. As electrons are transferred from the electron producing reaction to the electron consuming reaction, charge within the half cells in which these reactions are carried out is balanced by the movement of ions between the half cells.

Ion batteries utilize materials in their construction that exhibit low resistance to ion movement through and within their structure. Thus, ion batteries improve the efficiency of storing and transferring electrical energy by reducing the resistance that ions must overcome at the interfaces of the various phases within the battery, and improve energy storage capacity by utilizing materials which do not polarize, and therefore during charge movement do not build up space charge regions which contribute resistance to charge movement within the battery. This feature tends to permit a higher density of charge species to be moved within a given volume of an ion battery than is possible with conventional materials. Additionally, thin film techniques permit the formation of very thin electrolyte layers separating the redox couples, further reducing resistance to charge movement within the battery structure. Thin film ion batteries hold the promise of much higher energy densities than are possible from conventional wet chemistry batteries.

Ion batteries can be prepared from macroscopic compounding techniques to fabricate anode, cathode, and electrolyte materials which are then bonded together to form the battery (so called "thick film" technique), or by depositing thin films of such materials using vacuum techniques, producing "thin film" batteries. The fabrication of batteries by "thick film" techniques is usually directed toward high current capacity devices. Thin film batteries are generally employed in low current draw applications in which space and weight must be conserved.

U.S. Pat. No. 5,895,731 to Clingempeel (hereinafter, "the '731 patent") is exemplary of batteries fabricated using "thick film" construction. The '731 patent teaches the preparation of a cathode from a mixture of powders of titanium nitride, selenium, silicon, and buckminsterfullerene bonded together with epoxy polymer to aluminum foil. Additionally the '731 patent teaches the preparation of an anode from lithium foil, fiberglass matting and n-methyl-pyrrollidone, and the preparation of an electrolyte layer by gelation of a mixture of n-methyl-pyrrollidone, lithium metal, and polyimide powder to produce a cross-linked lithium gel electrolyte which is cast into a sheet. These materials are pressed together and sealed in polyimide plastic with appropriate electrical contacts to the anode and cathode. Production of such a battery requires strict atmospheric control during fabrication to exclude moisture and oxygen, and numerous preparatory steps.

Thin film battery fabrication techniques are well known to those skilled in the art. Thus, for example, U.S. Pat. No. 5,338,625 to Bates (hereinafter "the '625 patent"), teaches the formation of a lithium based thin film battery by vacuum deposition of two co-planar vanadium current collectors on an insulating substrate. Upon one of the current collectors is deposited a cathode comprising an amorphous vanadium oxide layer. This cathode layer is deposited by reactive ion sputtering from a vanadium target in an oxygen environment. On top of the cathode layer is deposited an amorphous lithium phosphorous oxynitride (also called "Sub-stoichiometric lithium phosphorous oxynitride") layer which acts as an electrolyte. This layer is deposited by reactive ion sputtering of lithium orthophosphate in a nitrogen atmosphere. Finally, a layer of lithium metal was vacuum evaporated onto the assembly, covering both the bare current collector and the current collector bearing the cathode and electrolyte. The disclosed thin film battery contains a bare lithium anode and as such requires further steps to isolate the anode from the ambient environment. Additionally, because of the presence of the relatively low melting lithium metal the disclosed battery has low tolerance for heating.

Hybrid batteries containing a combination of elements prepared by macroscopic compounding techniques which in turn have thin films deposited onto them have also been described. Thus, U.S. Pat. No. 5,569,520 (hereinafter "the '520 patent") and U.S. Pat. No. 5,612,152 (hereinafter "the '125 patent"), both to Bates, describe a preparation of a lithium manganate cathode pellet using traditional ceramic processing techniques (e.g., hot pressing and sintering the powder). The pellet is then subjected to deposition of a thin electrolyte film of, e.g., lithium phosphorous oxynitride (Sub-stoichiometric lithium phosphorous oxynitride), by reactive ion sputtering using the techniques described above for the '625 patent to Bates. A lithium film anode is then deposited on the exposed face of the electrolyte film, again by vacuum techniques, forming a multilayered thin film battery. The '520 and '152 patents further disclose that an additional mass of lithium can be incorporated into the battery by sandwiching the anode of the multi-layered battery material described above with an additional sheet of lithium foil and cycling the sandwiched construction through several charging/discharging cycles. In this process, the thin lithium film is "plated" onto the foil sandwiched with it to from a continuous phase with the electrolyte/lithium metal interface, bonding the lithium foil into the multi-layered material.

The '152 and '520 patents further disclose that deposition of a lithium anode film on the exposed face of the electrolyte of a multi-layer battery material can be eliminated for the process of bonding a foil sandwiched to the multi-layer battery material. These patents disclose that pressing a piece of lithium foil against the exposed face of the electrolyte layer of the multi-layer battery material and cycling the battery between charged and discharged states will also bond the lithium foil to the multi-layer battery material by virtue of deposition of lithium metal from the electrolyte during battery charging onto the face of the lithium foil in contact with the electrolyte.

Finally, the '152 and '520 patents teach that deposition of an anode can be dispensed with. Batteries can be fabricated by vacuum application of an electrolyte film onto a cathode material and the application of a current collector onto the exposed side of the electrolyte film. Cycling the battery through a charge cycle electrochemically deposits a lithium anode layer between the current collector and the electrolyte. Thus, a thin film of Sub-stoichiometric lithium phosphorous oxynitride was deposited by vacuum evaporation onto a $Li_2MnO_4$ cathode pellet, forming a sub-stoichiometric lithium phosphorous oxynitride film coating on one face of the cathode. Onto the exposed face of the sub-stoichiometric lithium phosphorous oxynitride film coating a current collecting layer of vanadium metal was deposited. This multi-layer battery material was subjected to a charging current, whereupon lithium metal was extracted from the electrolyte layer and plated onto the face of the vanadium current collector in contact with the electrolyte film.

Additional disclosure of the technique of electrochemical deposition of a lithium metal anode within the multi-layer structure of an electrolyte and cathode material has been described in PCT application US00/06997 of Lockheed Martin Energy Research Corporation, filed Mar. 17, 2000 (hereinafter, "the '997 application"). This application teaches the formation of a multi-layer battery material by sequential deposition of various thin films onto an insulating substrate. In this manner, a cathode current collector in the form of an Ag or Pt thin film was first deposited onto an alumina substrate. Following this a cathode film of $Li_2MnO_4$ was deposited onto the current collector by vacuum sputtering techniques. Onto the cathode film was deposited an electrolyte thin film of sub-stoichiometric lithium phosphorous oxynitride by reactive ion sputtering. Onto the exposed face of the sub-stoichiometric lithium phosphorous oxynitride electrolyte film was deposited a metal thin film to serve as an anode current collector. The metal was selected from metals that do not form intermetallic compounds with lithium, generally the group 8 transition metals, Ti, aluminum, gold, and in particular the refractory metals, as will be known to one skilled in the art.

Thus fabricated, this multi-layer battery material was subject to a charging current whereby a lithium anode was plated between the current collector thin film and the electrolyte. The '997 application further teaches that a protective layer must be deposited onto the current collector for the electrochemical anode deposition/stripping to be reversible. In this role, deposition of films of lithium nitride or sub-stoichiometric lithium phosphorous oxynitride onto the exposed face of the anode current collector film as protective layers is taught. The '997 application discloses that this over-layer functions to prevent lithium chemical attack upon the current collector, prevent undesirable morphology from occurring in the deposited lithium layer (a so called "fluffy" or "mossy" morphology), and to absorb the volume change thought to accompany the deposition of the lithium metal layer. The over-layer is said to additionally impart electrical insulation, mechanical protection, and act as a barrier to moisture and oxygen for the lithium layer.

While the plated lithium anode prior art has addressed some of the problems associated with the $Li/LiM_xO_y$ couple (where M=a transition metal), such as the heat sensitivity of lithium metal and some of the difficulties due to the air sensitive nature of lithium (see U.S. Pat. No. 5,871,865 to Barker et al. for a discussion of these and other problems arising from the presence of lithium metal in the preparation of batteries) there is still some inherent instability in lithium based batteries constructed according to disclosures in the prior art. This instability can be addressed by the addition of a protective layer to the anode current collector. Such a solution increases the bulk of a battery, reducing its current density, and adds a processing step, increasing its cost, without increasing the net capacity or performance of the battery.

The process of the present invention for production of multi-layer thin film battery precursor structure is directed to eliminating the need for an additional protective layer applied to the anode or anode current collector and to increasing the amount of lithium that may be electrochemically formed as an anode during activation of an "anodeless" battery precursor in the manner of Bates.

SUMMARY OF THE INVENTION

The present invention is directed toward minimizing the number of processing steps required to fabricate a thin film battery, and at increasing charge retention in a battery and the number of charge/discharge cycles that a battery can be subjected to without significant degradation. Additionally, the present invention seeks to provide a method of producing a lithium based battery which is air stable without the application of a protective overlayer following the formation of the anode, cathode, and electrolyte layers and charging of such a battery.

One aspect of the present invention is a process of producing a secondary, lithium based, thin film battery, having the steps of:

a) depositing a film comprising a solid state electrolyte material that is a conductor of lithium ions onto an exposed, conductive face of a substrate;
b) depositing a film of a transition metal oxide onto the electrolyte material;
c) forming a cathode film layer by lithiating the transition metal oxide film until it contains a supra-stoichiometric amount of lithium;
d) depositing an electron-conductive current collector film upon the cathode film layer;
e) forming a lithium metal buried anode layer between the conductive face of the substrate and the solid state electrolyte material using a flowing current between the substrate conductive face and the cathode current collector, in the process oxidizing the cathode film layer and causing lithium ions to migrate into and through the solid state electrolyte material, and then to be reduced to lithium metal and forming said buried anode layer; and
f) maintaining the current flow until the buried anode layer contains a desired amount of lithium metal.

Another aspect of the present invention are lithium thin film batteries with buried anodes and reverse structures made according to the above process.

Another aspect of the present invention is a process for producing a lithium based, thin film battery precursor composite structure, comprising the steps of:
a) depositing a film comprising a solid state electrolyte material that is a conductor of lithium ions onto an exposed, conductive face of a substrate;
b) depositing a film comprising a transition metal oxide on top of the film of solid state electrolyte material;
c) forming a cathode film layer by lithiating the transition metal oxide film until it contains a supra-stoichiometric amount of lithium; and
d) depositing a current collector film upon an exposed face of said cathode film layer, said current collector comprising an electron conducting material.

Another aspect of the present invention are lithium battery precursor composite structures made according to the process for producing battery precursor composite structures recited above.

Another aspect of the present invention is a lithium battery composite precursor, characterized by its ability to form a buried lithium anode layer at the interface between an anode current collector and an electrolyte when a current is maintained between the anode current collector and the cathode current collector, and its ability to be chemically stable when exposed to an ambient environment, the precursor having an anode current collector layer that forms a support and has at least one conductive face; an electrolyte layer that is a conductor of lithium ions and has one face in communication with a conductive face of the anode current collector layer; a cathode layer that is in communication with a face of the electrolyte layer that is not in communication with the anode current collector layer; and a cathode current collector layer that is in communication with a face of the cathode layer that is not in communication with the electrolyte layer.

Another aspect of the present invention is a lithium thin film battery having an anode current collector layer that forms a support and has at least one conductive face; a buried anode layer comprising lithium metal in communication with a conductive face of said anode current collector; an electrolyte that is a conductor of lithium ions and is in communication with said anode layer; a cathode layer that is in communication with a face of said electrolyte layer that is not in communication with said anode layer; and a cathode current collector layer that is in communication with a face of the cathode layer that is not in communication with the electrolyte layer, the battery being characterized by an increase in the amount of metallic lithium contained in its buried anode layer upon charging and a reduction in the amount of lithium metal in its buried anode layer upon discharging, and its chemical stability when exposed to an ambient environment in any state of charge.

Other aspects of this invention will appear from the following description and appended claims, reference being made to the accompanying drawings forming a part of this specification wherein like reference characters designate corresponding parts in the several views.

BRIEF DESCRIPTION OF THE DRAWINGS

Before explaining the disclosed embodiments of the present invention in detail, it is to be understood that the invention is not limited in its application to the details of the particular arrangement shown, since the invention is capable of other embodiments. Also, the terminology used herein is for the purpose of description and not of limitation.

FIG. 1: A Deposition Sequence Resolved Cross-Sectional Elevation View Of a Prior Art Thin Film Battery.

FIG. 2: A Cross-Sectional Elevation View Of a Battery Precursor Composite Structure.

DETAILED DESCRIPTION OF PREFERRED EMBODIMENTS

Figure 3:
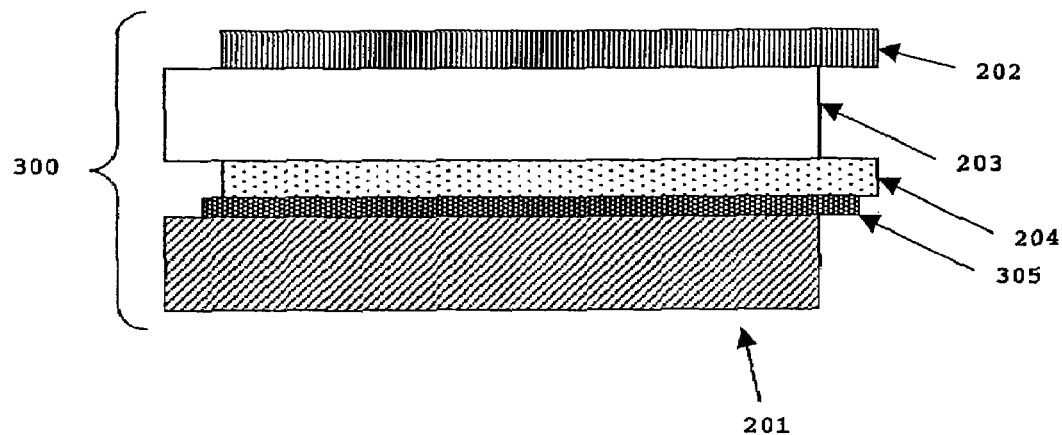
FIG. 3: A Cross-Sectional Elevation View Of a Thin Film Battery Formed By Activation Of a Precursor Composite Structure.

The present invention is directed to a lithium based thin film secondary battery. The thin film battery of the present invention can be fabricated by sequential vapor deposition techniques to effect the application of the several film layers required to form a complex structure (herein after, "battery precursor composite structure"). The battery precursor composite structure is then subjected to an activation step, and thereafter functions as a thin film lithium based battery.

The process of the present invention utilizes three vapor deposition steps to produce an air stable composite structure having a current collector layer, a cathode layer, and an electrolyte layer upon a conductive substrate. The order of these layers, as viewed from the conductive substrate, is reversed from that of conventional thin film batteries, which will be further elucidated below. The conductive substrate of the battery precursor composite structure serves as both a support for the precursor composite structure and, upon activation, as an anodic current collector in the resultant thin film battery. The various layers comprising the present invention battery structure can be deposited using one or more such techniques as will be familiar to one skilled in the art, for example, evaporation, sputtering, chemical vapor deposition, and the like.

The battery precursor composite structure is both oxygen and water vapor stable and thermally robust. As a consequence the battery precursor composite structure can be manipulated without isolation from the ambient environment and can withstand the elevated temperatures associated with electronic device processing. Thus, for example, the battery precursor composite structure of the present invention can withstand incorporation into circuit boards or other electronic or electrical subassemblies prior to soldering and/or encapsulation of the subassembly without utilizing any special environment, isolation steps, or heat sinking devices to protect it.

The battery precursor composite structure can be activated using an initial charging step in which a lithium metal anode is formed between the support and the electrolyte, thereby producing a lithium based thin film battery which is characterized by having the lithium metal layer buried in the structure of the battery (hereinafter, "buried anode structure") and requiring no additional layer to protect it from the ambient environment. This battery can be returned to the battery precursor composite structure state by completely discharging it, thereby consuming the anode and returning it to its "as deposited" battery precursor composite structure state.

With reference to FIG. 1, the prior art preparation of lithium based thin film secondary batteries begins with a substrate 100, typically an insulator comprising a metal oxide, upon which is deposited a cathode conductive current collector layer 101. The cathode current collector is chosen for high conductivity and chemical inertness, and is typically a metal. Metals used in the prior art for this purpose include platinum or gold.

Onto current collector layer 101 is deposited a cathodic electrode material 102. Cathodic electrode material 102, in the case of a lithium battery, is typically a lithium intercalation compound capable of reversibly ejecting lithium ions as the compound is oxidized, and injecting lithium ions as the compound is reduced. Examples of such compounds are lithium manganate ($LiMn_2O_4$), lithium nickelate ($LiNiO_2$), and lithium vanadate ($LiV_2O_5$). Other lithiated transition metal oxides have also been employed for this purpose.

Next, a solid state electrolyte layer 103 is deposited upon the cathodic electrode layer 102. Solid electrolyte 103 is chosen for its stability in contact with lithium metal and its ability to be a facile conductor of lithium ions between cathode 102 and anode 104. Typically, substoichiometric lithium phosphorous oxynitride is used as an electrolyte layer. Substiochiometric lithium phosphorous oxynitride is a family of materials having the general formula $Li_xPO_yN_z$. In the "as deposited" state, the material has values for x and y of about 3, and for z of about 1.5.

Onto electrolyte layer 103 is next deposited a layer of lithium metal which serves as anode 104. Some prior art devices include a barrier layer 107, chosen to be impermeable to Li atoms, is interposed between electrolyte layer 103 and lithium metal anode 104. The barrier layer prevents chemical attack upon the electrolyte layer by Li.

In the case where sub-stoichiometric lithium phosphorous oxynitride is chosen as the electrolyte layer, barrier layer 107 is not needed. Anode layer 104 is next deposited, either onto the exposed face of barrier layer 107, if it is used, or directly onto the exposed face of electrolyte layer 103, if barrier layer 107 is not used. In a lithium based battery, anode layer 104 is a lithium metal thin film.

Anode current collector 105 is then deposited onto anode 104. The anode current collector is chosen to preclude formation of lithium intermetallic compounds, and is selected from group 8 transition metals, Ti, and noble metals.

Finally, anode protection layer 106 is deposited onto current collector layer 105. Anode protection layer 106 is typically a second layer of sub-stoichiometric lithium phosphorous oxynitride or another moisture and electron impervious layer such as AlN. A typical thin film battery requires between five and seven deposition steps, at least one of which is carried out primarily to shield battery elements comprised of lithium metal from the ambient environment.

The sequence of the prior art deposition steps is chosen to minimize the problems associated with having a thermally labile and reactive species, such as lithium metal, present during deposition of subsequent layers, as would be the case if the above described deposition sequence were to be reversed, with a layer of lithium metal being deposited first and the remaining layers deposited on top of it.

If the lithium metal anode is eliminated, the prior art teaches that one may be formed electrochemically "in situ" by utilizing lithium contained in the cathode material. Such a scheme does not permit the formation of anodes with lithium present in supra-stoichiometric amounts relative to the cathodic material. Because the amount of lithium which can be incorporated into the anode is limited in this manner, the volumetric energy capacity of the battery can't be maximized. Additionally, the prior art suggests that the overlayer material must be selected to provide for volume changes in the anode layer during charging and discharging and to prevent undesirable morphology in the anode material as it is formed. If this is not done, battery failure will follow charging and discharging of the battery.

With reference to FIG. 2, the deposition of a reverse structure battery precursor composite structure 200 can be carried out in three deposition steps, building the functional layers up upon the anode current collector of the device. Thus, anode current collector (hereinafter, "substrate") 201 is chosen for its electrical conductivity and its inert character toward attack by lithium metal, as well as its ability to function as a support for the other layers deposited onto it. Substrate 201 may be, for example, a refractory metal, examples of which are copper and nickel. Substrate 201 may also be a ferrous alloy, for example steel, by way of example, stainless steel, for example type 430, also designated as ASTM A176 and type 304, also designated as type A167, which are articles of commerce recognized by those of ordinary skill in the art as an alloy which comprises also chrome. Substrate 201 may also be a layer of any other conductive metal that is compatible with lithium metal, for example iron, or any transition metal that does not form intermetallic compounds with lithium. Substrate 201 can also comprise a non-electrical conductor, for example glass or a plastic, such as will be familiar to those of ordinary skill in the art, for example, polyester onto which a conductive film has been deposited, for example gold.

Onto substrate 201 is deposited an electrolyte film layer 204. Electrolyte film layer 204 is chosen for its ability to be a facile conductor of lithium ions and for its stability when in contact with lithium metal. The electrolyte may be any solid state electrolyte that can be deposited by vacuum techniques that fulfills the criterion of facile lithium ion conduction and inertness toward lithium metal, but the preferred electrolyte is lithium phosphorous oxynitride (sub-stoichiometric lithium phosphorous oxynitride) as defined above.

Onto the exposed face of electrolyte film 204 (the face of the film layer that is not in contact with substrate 201) is deposited cathode layer 203. The material from which cathode layer 203 is formed may be any of the lithium intercalate materials which can reversibly eject lithium ions upon oxidation and inject lithium ions upon reduction. Examples of such materials are lithium manganate ($LiMn_2O_4$), lithium nickelate ($LiNiO_2$), and lithium vanadate ($LiV_2O_5$). These films can be deposited from sources containing lithium with subsequent elimination of the lithium insertion step, or from the transition metal oxide which is then subjected to a lithium insertion step.

The preferred method of fabricating cathode layer 203 is to deposit a transition metal oxide layer of desired thickness followed by lithiation of the transition metal oxide. This process permits a cathode layer 203 thus formed to contain a supra-stoichiometric amount of lithium which can be made available for formation of a lithium anode when battery precursor composite structure 200 is subjected to an activation step (described below). Lithiation of the oxide film can be accomplished by treating the transition metal oxide film with lithium vapor. It will be appreciated by one of skill in the art, that a transition metal oxide containing supra-stoichiometric amounts of lithium is more stable upon thermal exposure and upon exposure to the ambient environment than structures of the same type containing free lithium metal layers.

The preferred transition metal from which the oxide layer is formed is vanadium. A suitable vanadium oxide-based cathode layer 203 can be formed by first depositing a layer of $V_2O_5$ onto the exposed face of electrolyte layer 204 by, for example, reactive ion sputtering from a vanadium target in the presence of oxygen. Following this step, lithium metal can be vacuum evaporated onto the vanadium oxide layer, thus lithiating the oxide layer.

Other vacuum techniques as will be familiar to one skilled in the art can be employed to deposit various layers of the present invention battery. In particular, several techniques familiar to those of skill in the art can be used to deposit cathode layer 203, both in cases where the layer is a stoichiometric lithium transition metal oxide, and in cases where the layer contains a supra-stoichiometric amount of lithium metal.

In a fourth step following two film deposition steps and the lithiation step, a cathode current collector film 202 is deposited onto cathode film 203. Although cathode current collector film 202 may be any electrically conductive metal that is inert toward the cathode material, aluminum and copper are preferred.

A battery of the type shown in cross-section in FIG. 3 is formed by activating the multi-layer battery precursor composite structure 200. Multi-layer battery precursor composite structure 200 is activated by applying a source of sufficient electromotive force (emf) of constant polarity between substrate 201 and the cathode current collector layer 202. With reference to FIG. 3, in this manner, material in cathode layer 203 is oxidized. During this oxidation, lithium ions are ejected from cathode layer 203 and are conducted through the electrolyte layer 204. The lithium ions are subsequently electrochemically reduced to lithium metal at the electrolyte 204/support 201 interface, thus forming the buried lithium metal anode layer 305. This layer is termed buried because it is formed in such a manner that it is never exposed to the ambient environment, but is instead formed within the structure of the battery precursor composite material, and protected afterward by the thick conductive support 200 beneath it (as FIG. 3 is drawn) and by the other multiple layers above it. Current is passed into the device in this manner until a lithium anode layer of sufficient thickness has been formed.

Once the activation step is completed, thus depositing buried anode layer 305 of the desired thickness, battery 300 has a configuration which is inverted from that of the conventional lithium thin film battery (hereinafter, "reverse configuration"). This reverse configuration provides for a "buried anode" structure that both protects the anode, without additional protective layers, and provides for a battery that withstands exposure to the ambient environment and can withstand thermal excursions without deterioration.

Example 1

A coupon of type 430 stainless steel (an article of commerce also known to those of ordinary skill in the art as ASTM A176, an alloy having 16 wt. % chromium or more) was cut from sheet stock obtained from Teledyne Rodney Metals, Inc., New Bedford, Mass. The coupon was prepared for use as an anode current collector/substrate 201 by washing the stainless steel in a detergent solution, rinsing with deionized water, followed by an additional ethyl alcohol rinse, and drying in room air. The detergent employed was Alkanox, a commercial detergent for cleaning laboratory glassware, but any neutral detergent formulated for such purpose can alternatively be employed.

Thus prepared, the substrate was placed into a vacuum chamber containing a target of $Li_3PO_4$. The chamber was evacuated to $10^{-5}$ torr and a sub-stoichiometric lithium phosphorous oxynitride film of 1.0 nm-thick electrolyte layer 204 was formed upon the exposed face of the stainless steel substrate by reactive ion sputtering in 20 millitorr of nitrogen gas using an RF power setting of 4-5 watts/cm$^2$.

A 500 nm-thick cathode film 203 was next formed by first depositing a vanadium oxide film onto the electrolyte film. This vanadium oxide thin film was deposited by thermal evaporation of a corresponding $V_2O_3$ powder source.

Thus formed, the vanadium oxide layer was then lithiated by exposing the vanadium oxide layer to lithium vapor. Lithium vapor was obtained by thermal evaporation of pure Li metal onto the $V_2O_5$ layer at room temperature in a $10^{-5}$ mbar vacuum. Upon contact with the vanadium oxide film, lithium diffuses into the vanadium oxide material, forming a lithium vanadium oxide cathode. Treatment with lithium vapor was continued until a material approximating the formula $Li_xV_2O_5$ was obtained, wherein X is less than or equal to three.

Onto the lithiated vanadium oxide layer was deposited a 200-300 nm layer of aluminum metal by vacuum evaporation to act as the cathode current collector 202.

Thus prepared, the multi-layered battery precursor composite structure 200 was removed from the vacuum chamber and connected to an Arbin potentio-galvanostat to apply a constant current and monitor voltage changes. Current was applied to the multi-layered material until the cell voltage reached about 3.8 V vs. Li. In this manner a buried lithium anode was created forming a thin-film battery which could be handled in the ambient environment without further isolation. The discharge capacity of this battery was about 25 □Ah/cm$^2$ which corresponds to 1.4 Li per mole of $V_2O_5$.

Example 2

Figure 4:
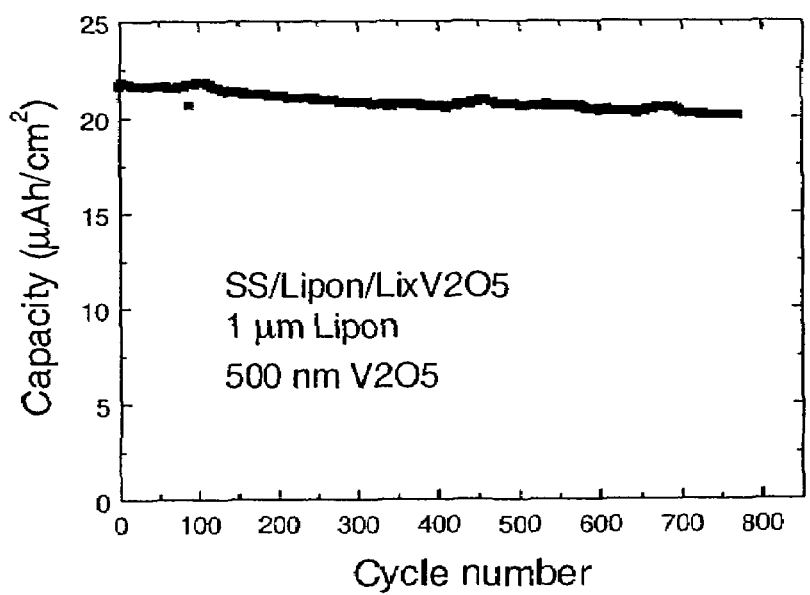
FIG. 4: A Graph of the Charge Capacity of a Battery of the Present Invention as a Function of Charge/Discharge Cycle Number.

The battery device of Example 1 was subjected to cyclic testing for over 750 charge/discharge cycles. This was accomplished by charging and discharging the battery under conditions in which charging current having a current density of 0.1 mA/cm$^2$ was applied until a potential of about 3.8 V vs lithium was observed across the battery. Discharge cycles were carried out at the same current density and continued until a potential of about 2.0 V vs lithium was observed across the battery. The results are presented in FIG. 4. It can be seen that the capacity of the battery did not appreciably change in over 800 such charge/discharge cycles. The battery retained its ability to be handled in the ambient environment throughout the charge/discharge test.

Although the present invention has been described with reference to preferred embodiments, numerous modifications and variations can be made and still the result will come within the scope of the invention. No limitation with respect to the specific embodiments disclosed herein is intended or should be inferred.

We claim:

1. A thin film lithium secondary battery composite precursor comprising:
   a) an anode current collector layer deposited by vacuum vapor deposition that has at least one conductive face and is characterized by its ability to function as a self-supporting substrate
   b) a buried electrolyte layer deposited by vacuum vapor deposition, one face of which is in communication with a conductive face of said anode current collector layer, wherein said electrolyte layer is a conductor of lithium ions and exhibits chemical stability upon contact with lithium metal;
   c) a cathode layer deposited by vacuum vapor deposition and subsequently lithiated with a supra stoichiometric amount of lithium, the cathode layer in communication with a face of said electrolyte layer that is not in communication with said anode current collector layer; and
   d) a cathode current collector layer deposited by vacuum vapor deposition and that is in communication with a face of the cathode layer that is not in communication with the electrolyte layer, the composite precursor being characterized by its ability to form a buried lithium anode layer at the interface between said anode current collector and said electrolyte when a current is maintained between the anode current collector and the cathode current collector, and its ability to be chemically stable when exposed to an ambient environment.

2. The composite thin film structure of claim 1 having an anode current collector comprising a stainless steel, an electrolyte comprising sub-stoichiometric lithium phosphorous oxynitride, and a supra stoichiometric cathode layer comprising a material of the formula $Li_xV_2O_5$, where X is about 3 or greater.

* * * * *